United States Patent [19]
Pierce

[11] Patent Number: 4,823,497
[45] Date of Patent: Apr. 25, 1989

[54] RATTLING, GLOWING, SCENT DISPENSING FISHING LURE

[76] Inventor: Kevin W. Pierce, 10832 Onyxstone, El Paso, Tex. 79924

[21] Appl. No.: 196,267

[22] Filed: May 20, 1988

[51] Int. Cl.⁴ ............................................. A01K 85/00
[52] U.S. Cl. .................................... 43/17.6; 43/42.31; 43/44.99; 43/42.19
[58] Field of Search .................. 43/42.06, 17.1, 44.99, 43/42.31, 42.19

[56] References Cited

U.S. PATENT DOCUMENTS

| | | | |
|---|---|---|---|
| 1,876,559 | 9/1932 | Drake | 43/42.31 |
| 2,711,044 | 6/1955 | Woods | 43/17.6 |
| 3,040,462 | 6/1962 | Guida | 43/42.31 |
| 3,705,465 | 12/1972 | Charney | 43/42.06 |
| 3,708,903 | 1/1973 | Bercz | 43/42.06 |
| 3,722,128 | 3/1973 | Tremblay | 43/42.06 |
| 3,757,455 | 9/1973 | Strader | 43/42.31 |
| 4,098,017 | 7/1978 | Hall | 43/42.06 |
| 4,432,156 | 2/1984 | Gowing | 43/42.31 |
| 4,453,335 | 6/1904 | Smith | 43/42.06 |
| 4,610,103 | 9/1986 | Steinman | 43/17.6 |
| 4,700,504 | 10/1987 | Mattism | 43/17.6 |
| 4,709,499 | 12/1987 | Ottaviano | 43/17.6 |

FOREIGN PATENT DOCUMENTS 1012381  12/1965  United Kingdom ............... 43/44.99

Primary Examiner—Nicholas P. Godici
Assistant Examiner—Karen Skillman
Attorney, Agent, or Firm—Jerry T. Kearns

[57] ABSTRACT

A fishing lure has a generally oval tapered body with a radiused rear tip portion and is formed from a transparent plastic material. In a first embodiment, a flattened diving lip extends forwardly from a front end portion of the body. This lip may be omitted on floating or top water type lures. A cylindrical recess extends rearwardly from a front portion of the body, and receives a replaceable chemical light producing tube. A cavity in the hollow body, beneath the cylindrical recess, receives a plurality of balls. A transverse cylindrical bore adjacent the radiused rear tip portion of the body contains a cylindrical sponge which may be treated with a variety of fish attracting scents. In the first embodiment, a line attachment eyelet is secured to the upper surface of the diving lip and a pair of hook attaching eyelets are secured to the body portion. In use, the combination of the chemically produced light, the rattling of the balls in the cavity and the fish attracting scent provide a greatly improved fishing lure. In a second embodiment, a floating or top water type lure is constructed without a diving lip, and includes a rear mounted propeller apparatus to aid in creating sound and surface splashing as the lure is pulled through the water.

3 Claims, 5 Drawing Sheets

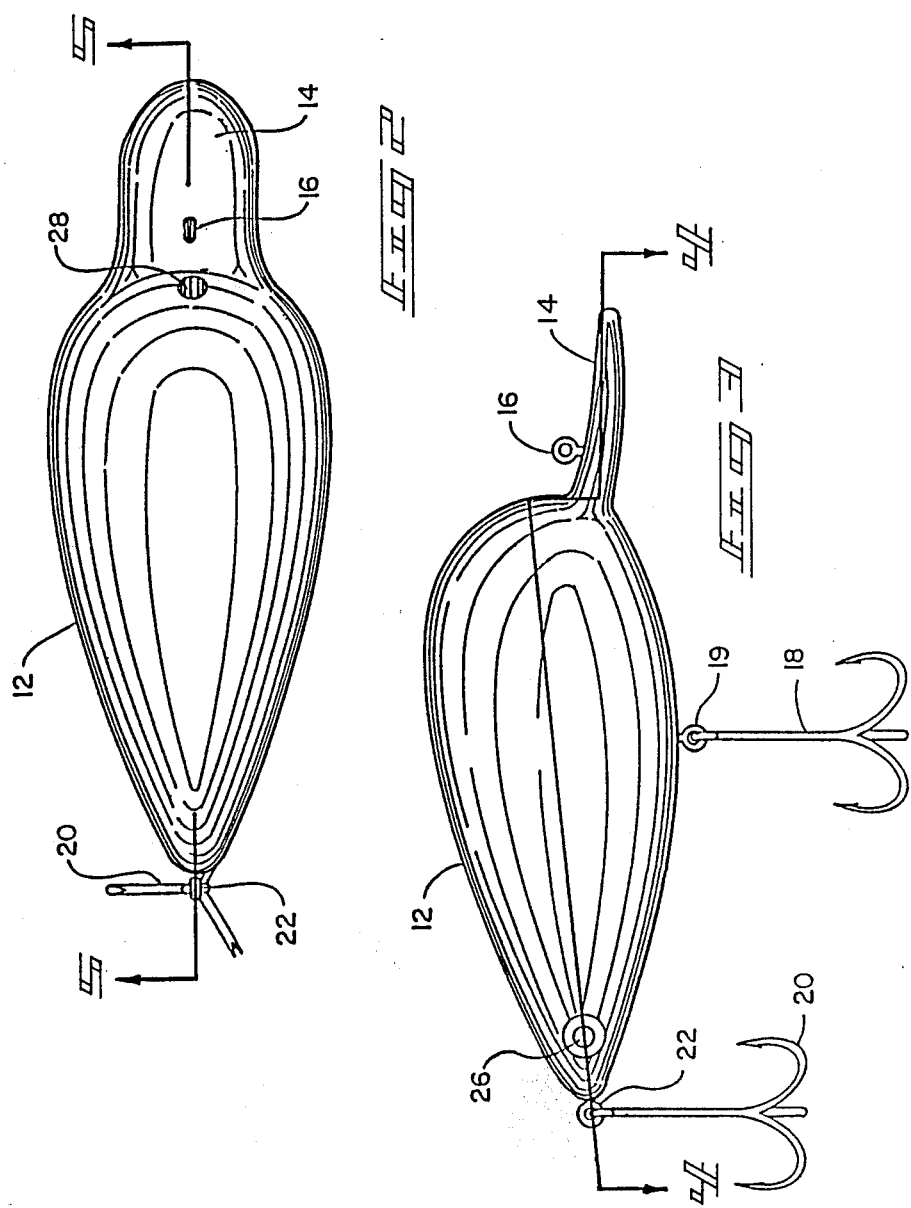

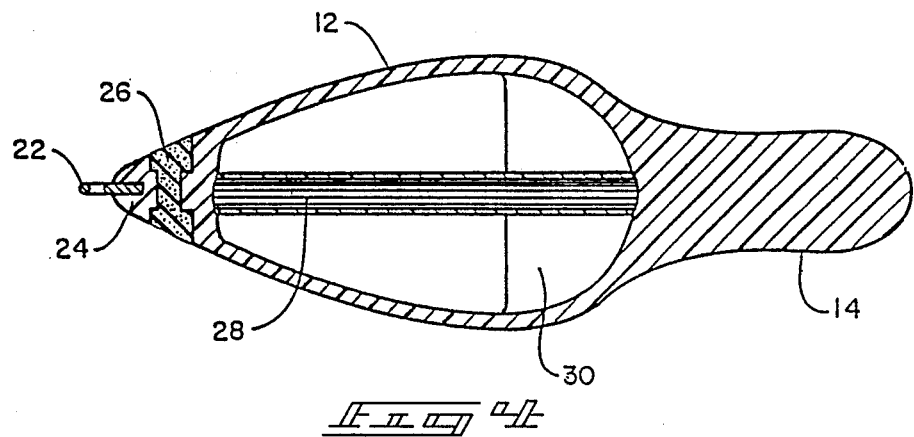
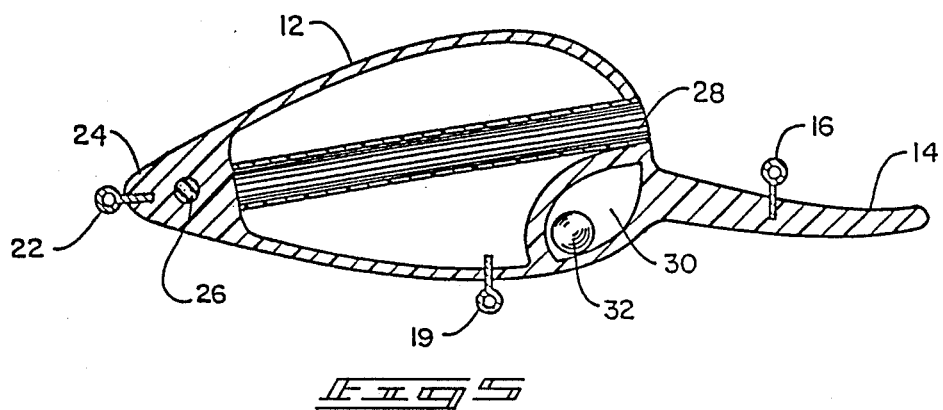

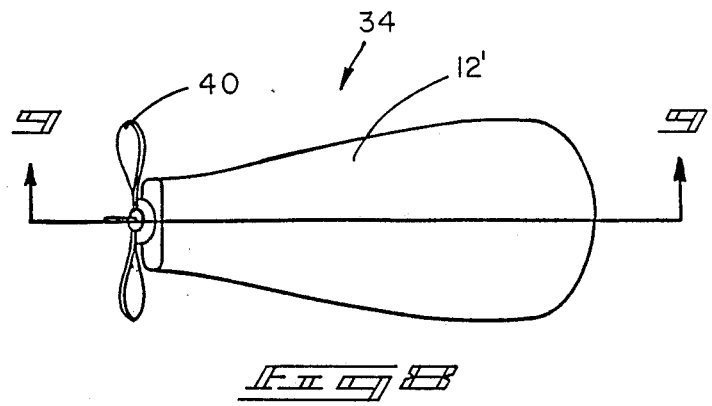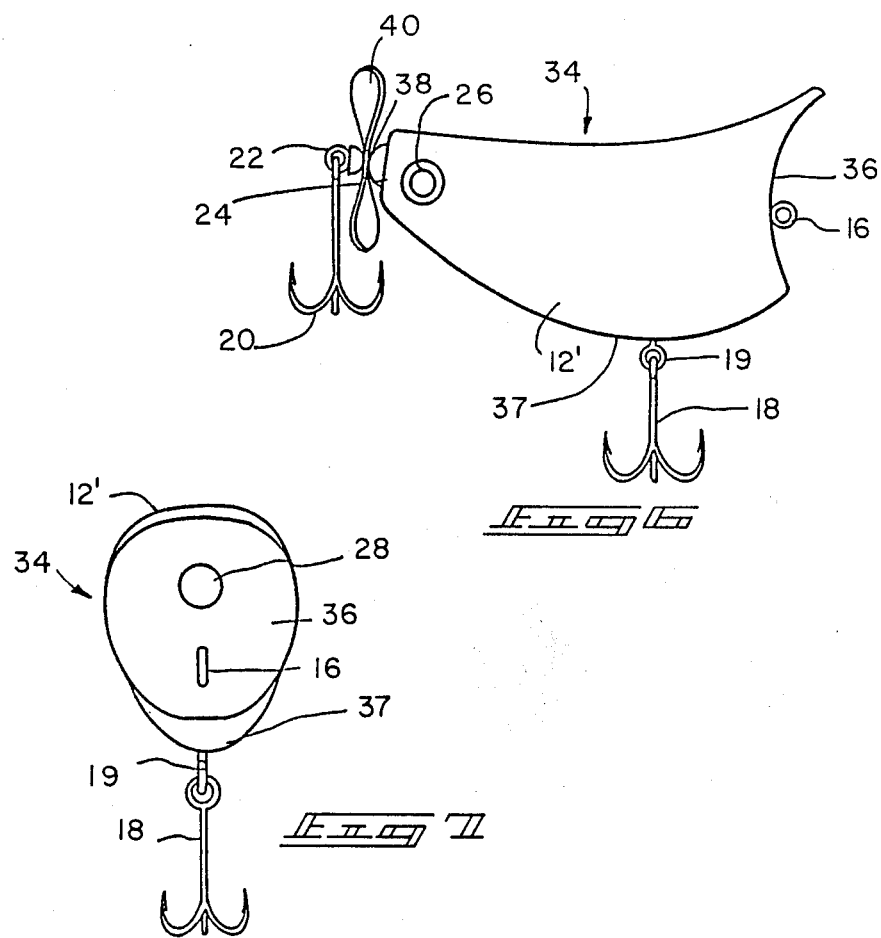

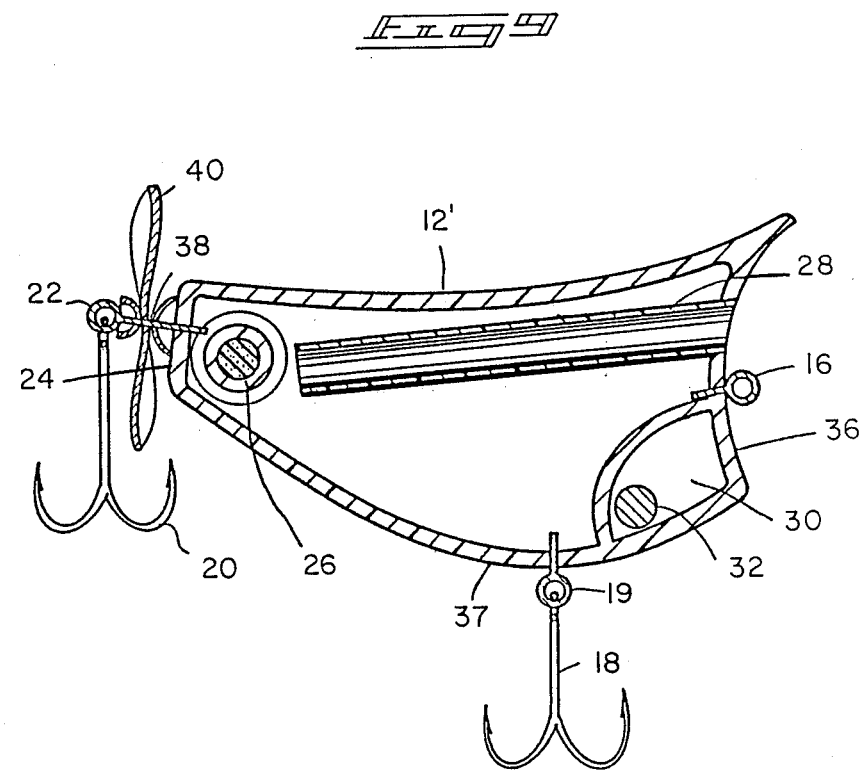

RATTLING, GLOWING, SCENT DISPENSING FISHING LURE

BACKGROUND OF THE INVENTION

1. Field of the Invention

The present invention relates to fishing lures, and more particularly pertains to a new and improved fishing lure which is provided with chemically produced illumination, a sound producing mechanism and a scent dispensing device. Many species of fish are attracted to sources of light. This phenomena has been recognized by fishermen, who have utilized bright lights to attract schools of fish. Fish may also be attracted by dispersing a scent attractant into the water. A third method of attracting fish is to produce sounds in the water. The present invention provides an enhanced fishing lure which combines all of these fish attracting methods into a single fishing lure.

2. Description of the Prior Art

Various types of fishing lures are known in the prior art. A typical example of such fishing lure is to be found in U.S. Pat. No. 3,705,465, which issued to A. Charney on Dec. 12, 1972. This patent discloses a fishing lure having an elongated hollow body of light refracting plastic material with smoothly curved side walls which terminate at one or both ends with an oblique face to provide a circle of emitted light. The surfaces of the body are also provided along the bottom thereof, with a pair of ribs extending substantially the full length of the body with relatively narrow outwardly facing, light emitting surfaces disposed obliquely to the adjacent wall surfaces. A plurality of salmon eggs, spinners, or a roller knocker ball may be contained within the interior of the hollow body. U.S. Pat. 3,708,903, which issued to C. Bercz et al on Jan. 9, 1973, discloses a self illuminating fishing lure having a cavity receiving chemiluminescent material and comprising a gas permeable member impervious to the chemiluminescent material for reducing pressure build up within the cavity by gas diffusion. U.S. Pat. No. 3,722,128, which issued to D. Tremblay on Mar. 27, 1973, discloses a snag shield and scent carrier for fishing lure hooks which utilizes a flexible porous shield engaged over the shank of a fish hook which shields the barbs from snags yet does not interfere with the barb engagement when struck. The porous material may also be used as a scent carrier. U.S. Pat. No. 4,453,335, which issued to J. Smith on June 12, 1984, discloses a fishing lure that emanates an audible sound as the lure is drawn through water. Sound is generated by the oscillatory movement of a ball in a bore within the lure, in response to movement of water through the bore. The rate of oscillation, and thus the pitch of the sound, can be adjusted by the user. U.S. Pat. No. 4,610,103, which issued to K. Steinman on Sept. 9, 1986, discloses a fishing lure having a hollow transparent body. An open ended transparent tube is projected through the body with its open ends flush with the body surface and secured thereto. An elongated flexible light capsule containing liquid chemicals is snugly and frictionally nested and removably secured within the tube. The chemicals are mixed by bending the capsule before insertion to produce a chemical luminescence to illuminate the lure body. The lure is provided with a flattened diving lip adjacent a front portion thereof and a tapered radiused tip adjacent a rear portion thereof. A pair of treble hooks are secured to the lure body by eyelets.

While the above mentioned devices are suited for their intended usage, none of these devices provide a fishing lure which combines chemical luminescence, rattling balls and scent dispenser forms of fish attracting devices within the body of a single lure. Inasmuch as the art is relatively crowded with respect to these various types of fishing lures, it can be appreciated that there is a continuing need for and interest in improvements to such fishing lures, and in this respect, the present invention addresses this need and interest.

SUMMARY OF THE INVENTION

In view of the foregoing disadvantages inherent in the known types of fishing lures now present in the prior art, the present invention provides an improved rattling, glowing, scent dispensing fishing lure. As such, the general purpose of the present invention, which will be described subsequently in greater detail, is to provide a new and improved rattling, glowing, scent dispensing fishing lure which has all the advantages of the prior art fishing lures and none of the disadvantages.

To attain this, representative embodiments of the concepts of the present invention are illustrated in the drawings and make use of a generally oval tapered body with a radiused rear tip portion formed from a transparent plastic material. In the first embodiment, a flattened diving lip extends forwardly from a front end portion of the body. A cylindrical recess extends rearwardly from a front portion of the body, and receives a replaceable chemical light producing tube. A cavity in the body, beneath the cylindrical recess, receives a plurality of balls. A transverse cylindrical bore adjacent the radiused rear tip portion of the body receives a cylindrical sponge treated with a fish attracting scent. In the first embodiment, a line attachment eyelet is secured to the upper surface of the diving lip and a pair of hook attaching eyelets are secured to the body portion. In the second embodiment, the diving lip is omitted in the construction of a surface, or floating type lure. A rear mounted propeller is provided for the purpose of additional sound production and water surface disturbance as the lure is pulled through the water. In use, the combination of the chemically produced light, the rattling of the balls in the cavity and the fish attracting scent provide a greatly improved fishing lure.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved rattling, glowing, scent dispensing fishing lure which has all the advantages of the prior art fishing lures and none of the disadvantages.

It is another object of the present invention to provide a new and improved rattling, glowing, scent dispensing fishing lure which may be easily and efficiently manufactured and marketed.

It is a further object of the present invention to provide a new and improved rattling, glowing, scent dispensing fishing lure which is of a durable and reliable construction.

An even further object of the present invention is to provide a new and improved rattling, glowing, scent dispensing fishing lure which is susceptible of a low cost of manufacture with regard to both materials and labor, and which accordingly is then susceptible of low prices of sale to the consuming public, thereby making such fishing lures economically available to the buying public.

Still yet another object of the present invention is to provide a new and improved rattling, glowing, scent dispensing fishing lure which provides in the apparatuses and methods of the prior art some of the advantages thereof, while simultaneously overcoming some of the disadvantages normally associated therewith.

Still another object of the present invention is to provide a new and improved rattling, glowing, scent dispensing fishing lure which utilizes a chemical luminescent material, rattling balls, a splashing propeller and a scented sponge to provide enhanced attraction of fish.

Yet another object of the present invention is to provide a new and improved rattling, glowing, scent dispensing fishing lure which provides visual, audio and olfactory sensory stimulants.

Even still another object of the present invention is to provide a new and improved rattling, glowing, scent dispensing fishing lure which provides visual, audio, and olfactory sensory stimulants in conjunction with a rotationally mounted rear propeller in the body of a single lure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention Will be better understood and objects other than those set forth above will become apparent when consideration is given to the following detailed description thereof. Such description makes reference to the annexed drawings wherein:

FIG. 2 is a top view of the fishing lure according to the first embodiment of the present invention.

FIG. 3 is a side view of the fishing lure according to the first embodiment of the present invention.

FIG. 4 is a cross sectional view, taken along line 4—4 of FIG. 3, illustrating the fishing lure according to the first embodiment of the present invention.

FIG. 5 is a cross sectional view, taken along line 5—5 of FIG. 2, illustrating the fishing lure according to the first embodiment of the present invention.

FIG. 6 is a side view of a modified form of top water or floating type fishing lure according to a second embodiment of the present invention.

FIG. 7 is a front end view of the fishing lure according to the second embodiment of the present invention.

FIG. 8 is a top view of the fishing lure of the second embodiment of the present invention.

FIG. 9 is a cross sectional view, taken along line 9—9 of FIG. 8, illustrating the fishing lure of the second embodiment of the present invention.

DESCRIPTION OF THE PREFERRED EMBODIMENT

Figure 1:
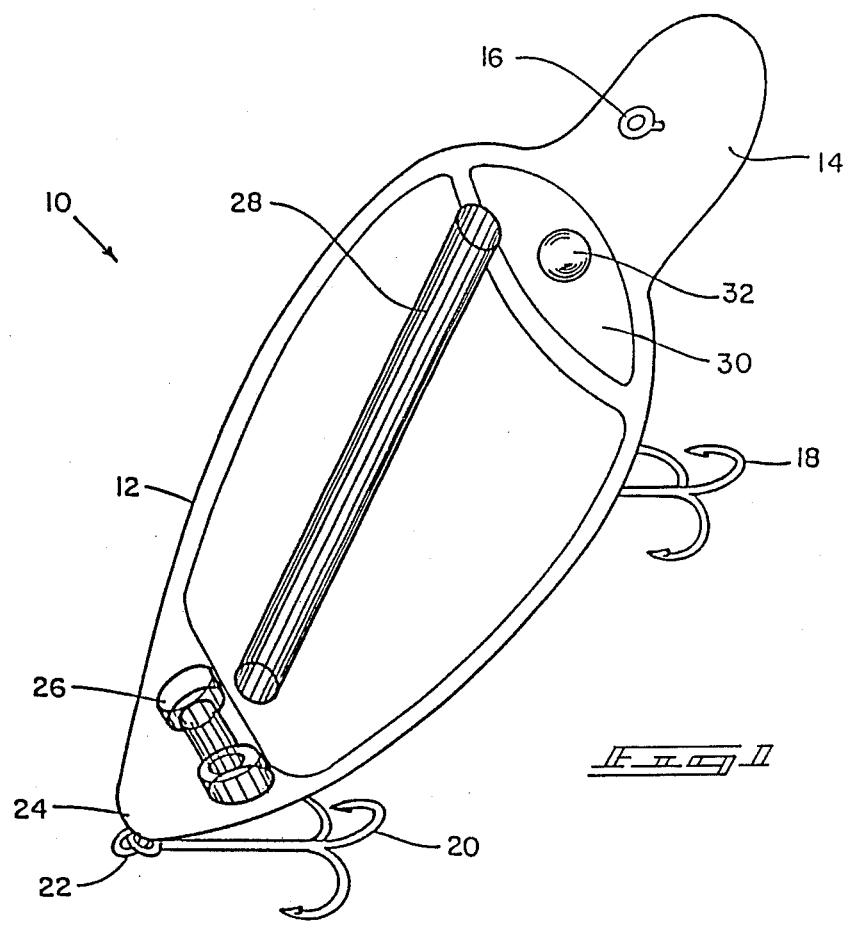
FIG. 1 is a perspective view of the fishing lure according to the first embodiment of the present invention.

With reference now to the drawings, and in particular to FIG. 1 thereof, a new and improved rattling, glowing, scent dispensing fishing lure embodying the principles and concepts of the present invention and generally designated by the reference numeral 10 will be described.

More specifically, it will be noted that the first embodiment 10 of the invention includes a body 12 having a generally tapered oval configuration. The body 12 is preferably formed from a transparent plastic material. A flattened diving lip 14 extends forwardly from a front portion of the body 12. An eyelet 16 is provided on the diving lip 14 for attachment to a fishing line. A front treble hook 18 is attached on the bottom surface of the body 12 at a central portion thereof. A rear treble hook 20 is secured to the body 12 by an eyelet 22 which extends rearwardly from the rear tip portion 24 of the body 12. The rear tip portion 24 is tapered to a narrow radiused tip. A transverse bore 26 extends through the body 12, adjacent the rear tip portion 24. Both ends of the transverse bore 26 are counter sunk as illustrated. In use, a cylindrical sponge soaked with a conventional fish attracting scent is inserted through the transverse bore 26. The counter sunk portions of the bore 26 allow the ends of the cylindrical sponge to radially expand, thus providing an increased surface area for dispensing the fish attracting scent into the water. An elongated cylindrical recess 28 is formed in the body 12. The recess 28 extends rearwardly from a front portion of the body 12, adjacent the diving lip 14. In use, an elongated flexible capsule containing chemiluminescent liquid materials is removably secured within the cylindrical recess 28. These chemiluminescent materials may be as described in U.S. Pat. No. 4,610,103, the disclosure of which is hereby incorporated by reference. Other suitable materials include the CYALAUMALITE type chemical light produced by AMERICAN CYANAMID CO. A hollow cavity 30 in the body 12 receives a plurality of loose balls 32. The balls 32 may be formed from metal or plastic and rattle within the cavity 30, producing a fish attracting audio effect.

With reference now to FIG. 2, it may be seen that the body 12 has a generally tapered oval configuration with a wide front portion adjacent the cylindrical recess 28 and the flattened diving lip 14. The cylindrical recess 28 extends generally parallel to the central longitudinal axis of the body 12. As shown in FIG. 3, a hook attaching eyelet 19 extends from a central bottom surface of the body 12. A front treble hook 18 is secured to the body 12 by the eyelet 19. The transverse bore 26 extends from side to side through the body 12 adjacent the tapered radiused rear tip 24. The rear treble hook 20 is mounted to the body 12 by an eyelet 22 extending from the rear tip 24.

As shown in the cross sectional view of FIG. 4, the elongated cylindrical recess 28 extends within the body 12 above the hollow cavity 30. The cylindrical recess 28 extends generally parallel to the longitudinal axis of the body 12. The sponge filled transverse bore 26 provides counter sunk portions at each side to provide an enhanced surface area to dispense the fish attracting scent from the sponge.

As shown in FIG. 5, a plurality of balls 32 are held loosely captive in the cavity 30 and are free to rattle about therein. The diving lip 14 provides an action to the lure which rattles the balls 32 within the cavity 30, producing a fish attracting audio effect.

In FIG. 6, a side view of a second embodiment 34 of a fishing lure according to the present invention is illustrated. The construction of the second embodiment 34 is generally similar to the construction of the first embodiment 10, and the same reference numerals have been utilized to identify similar parts. The fishing lure 34 according to the second embodiment of the present invention includes a body portion 12' having a curved configuration with a flattened front surface 36, and a lower curved belly portion 37. The body 12' tapers to a narrow rear tip portion 24. A hook attaching eyelet 22 extends from the rear tip portion 24 and mounts a rear treble hook 20. A propeller 40 is mounted for free rotation on the shank 38 of the eyelet 22. A transverse bore 26 having counter sunk portions at each and serves to mount a fish attractant treated scented sponge adjacent the rear tip portion 24. In use, the propeller 40 rotates as the lure 34 is pulled through the water, causing dispersion of the fish attractant and creating additional sound and surface disturbance.

As shown in FIG. 7, an elongated cylindrical recess 28 extends within the body 12' and is generally parallel to the central longitudinal axis of the body 12'. A fishing line attaching eyelet 16 is secured to the front surface 36.

In FIG. 8, a top view of the fishing lure 34 according to the second embodiment of the present invention is provided.

As shown in the cross sectional view of FIG. 9, an enclosed cavity 30 contains a plurality of balls 32 which are held loosely captive therein. The cylindrical recess 28 opens outwardly at the flattened front end 36 of the body 12'. A chemiluminescent light tube is removably received within the cylindrical recess 28, as described in detail with respect to the first embodiment 10 of the present invention. These light tubes are available in green, red, blue, white, and a variety of other possible combinations. This allows the user to easily change the overall color scheme and look of the lure by changing light tubes. Thus, by the use of a clear transparent plastic material for the construction of the body 12' of the lure, the lure will take on the color of the light tube inserted within the recess 28. This allows different colors, or color combinations to be utilized dependent on the type of fish, the time of day or night, and the personal preferences of the user. It should be noted that the majority of the lure interior is hollow, which ensures that the lure will float on the surface of the water. In use, as the lure is pulled along the surface of the water, the balls 32 will rattle, fish attractant scent will be emitted by the sponge 26, the propeller 40 will rotate producing a splashing sound and a surface disturbance, and the chemiluminescent light will be visible to fish through the transparent belly portion 37 of the body 12'. The combination of these features produces a greatly improved fish attracting effect.

It should be understood that the lures 10 and 34 of the present invention may be formed in a variety of sizes for use in catching various different sizes and species of fish.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved rattling, glowing, scent dispensing fishing lure, comprising:
   an elongated body having a generally tapered oval configuration;
   said body formed from a transparent plastic material;
   a flattened diving lip extending forwardly from a front end portion of said body;
   a line attachment eyelet extending upwardly from said diving lip;
   a cylindrical recess extending rearwardly into said body portion adjacent said front end portion, said recess extending generally parallel to a longitudinal axis of said body;
   chemical light producing means in said cylindrical recess;
   an elongated cavity in said body beneath said cylindrical recess and adjacent said front end portion;
   a plurality of balls received in said enlarged cavity;
   a first front hook attachment eyelet extending centrally from a bottom surface of said body;
   a first hook attached to said first eyelet;
   a tapered radiused rear tip portion formed on said body;

a second hook attachment eyelet extending generally parallel to said body longitudinal axis from said tapered radiused rear tip portion;
a second hook attached to said second eyelet;
a transverse bore extending through said body adjacent said rear tip portion;
a counter sunk portion formed at each end of said transverse bore; and
a cylindrical sponge treated with a fish attracting scent received in said transverse bore.

2. A new and improved rattling, glowing, scent dispensing fishing lure, comprising:
an elongated body having a curved configuration with an enlarged curved belly portion and a flattened front surface;
said body formed from a transparent plastic material;
a first hook attachment eyelet having an elongated shank extending from a rear tip portion of said body;
a propeller mounted for free rotation on said elongated shank;
a line attachment eyelet extending forwardly from said front surface;
a cylindrical recess extending rearwardly into said body portion adjacent said front surface, said recess extending generally parallel to a longitudinal axis of said body;
chemical light producing means in said cylindrical recess; a cavity in said body beneath said cylindrical recess;
a plurality of balls received in said cavity; a second hook attachment eyelet extending centrally from said belly portion of said body;
a first hook attached to said first eyelet;
a second hook attached to said second eyelet;
a transverse bore extending through said body adjacent said rear tip portion;
a counter sunk portion formed at each end of said transverse bore; and
a cylindrical sponge treated with a fish attracting scent received in said transverse bore.

3. A new and improved rattling, glowing, scent dispensing fishing lure, comprising:
an elongated body, formed from a transparent material, and having a generally tapered oval configuration;
a cylindrical recess extending rearwardly into said body, adjacent a front end portion thereof, said recess extending generally parallel to a longitudinal axis of said body;
chemical light producing means in said recess;
an enlarged cavity in said body, beneath said cylindrical recess and adjacent said front end portion;
a plurality of balls in said cavity;
hook means attached to said body;
a flattened diving lip extending forwardly from said front end portion of said body;
said body having a tapered radiused rear tip portion;
a transverse bore extending through said body, adjacent said rear tip portion; and
a sponge treated with a fish attracting scent received in said transverse bore.

* * * * *